United States Patent Office 3,476,217
Patented Nov. 4, 1969

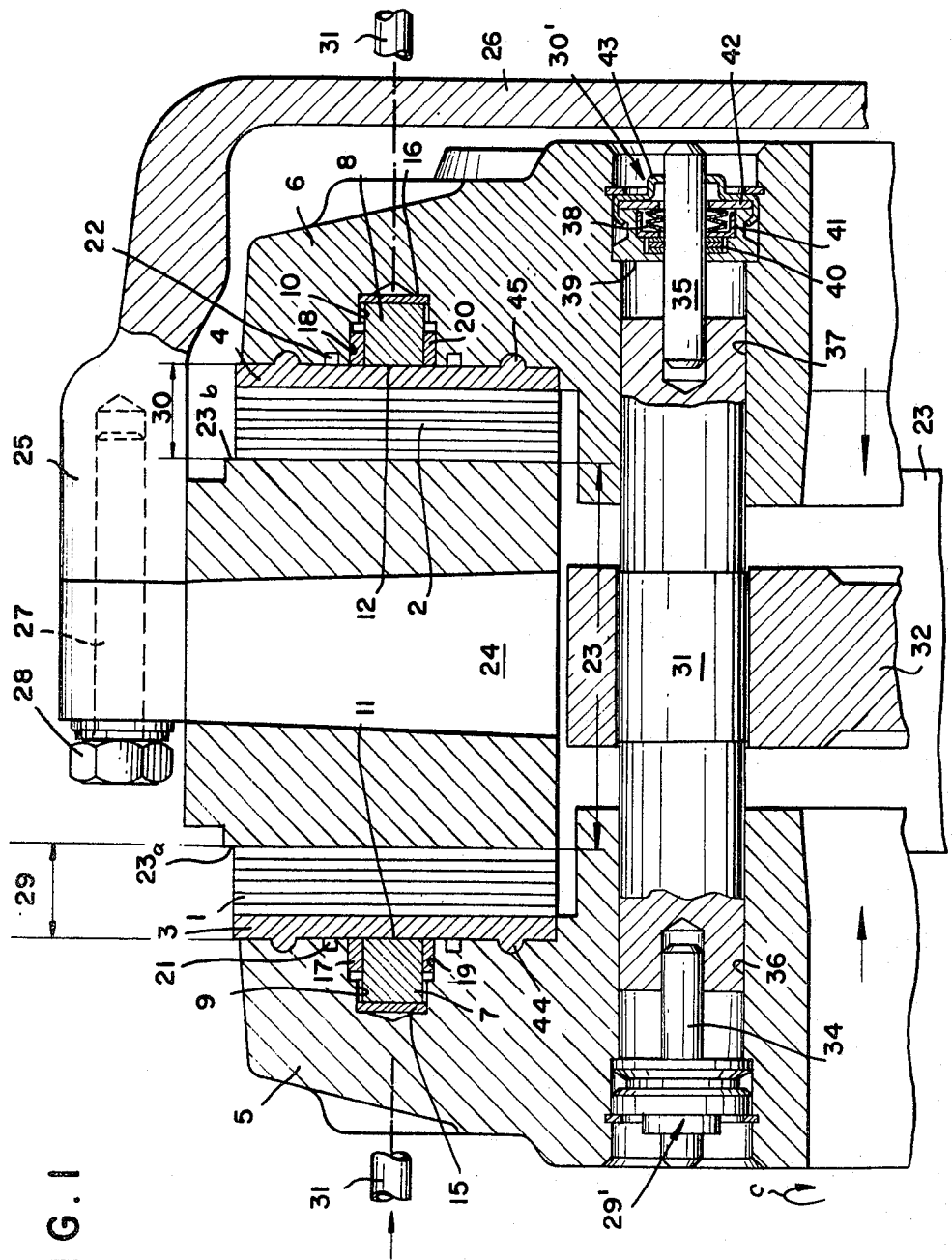

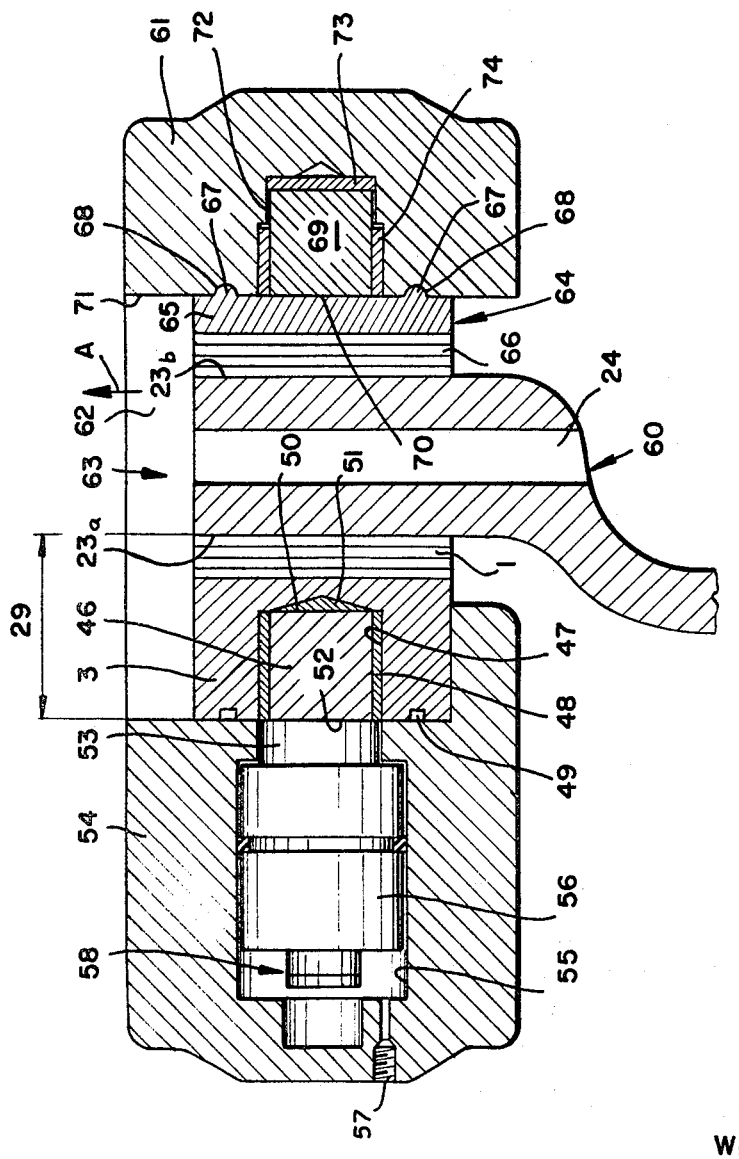

3,476,217
MAGNETIC BRAKE SHOE SECURING MEANS
Wilhelm Knapp, Bad Homburg vor der Hohe, Germany, assignor to Alfred Teves GmbH, Frankfurt am Main, Germany, a corporation of Germany
Filed Feb. 28, 1968, Ser. No. 708,954
Claims priority, application Germany, Mar. 2, 1967, T 33,329
Int. Cl. F16d 55/02, 63/00, 65/14
U.S. Cl. 188—73                            3 Claims

ABSTRACT OF THE DISCLOSURE

A disk brake for automotive vehicles in which the anchorage of the brakeshoe in the brake housing is provided through a magnetic attraction effective between the brakeshoe backing plate and the housing.

---

The present invention relates to a disk brake for automotive vehicles and more particularly to novel means for securing the brakeshoes effectively to the supporting members of the brake system.

Concern with a safe and reliable anchorage for brakeshoes is manifest in a number of proposals submitted in prior art, which attempt to deal with the deleterious effects of vibration of the brakeshoe backing plates and the difficulties inherent in attempts to replace brakeshoes where complex retaining means is used.

It is, therefore, the primary object of this invention to provide a fastening means for brakeshoes which combines utmost reliability and safety with economy in manufacture and service.

Another object is to provide these means within the limited space available for the installation of a conventional disk brake system.

These objects and others which will become apparent hereinafter are attained, in accordance with the present invention, through an attractive magnetic force introduced between the brakeshoe and the brakeshoe support in the brake housing. This establishes a firm and tight connection between the two members which remains constant under vibrational and other dynamic strain and is unaffected by temperature changes due to the heat of friction developed through the braking action. I therefore provide a magnet, preferably a permanent magnet, recessed either in the brakeshoe or in the brakeshoe support, to be confronted by a surface of corresponding dimensions and made of highly permeable material in the proximate element.

According to a more specific feature of this invention the magnet is received in the brakeshoe support or carrier which may be formed with a bore or recess into which the magnetic body, e.g. a cylindrical plug, is tightly fitted so as to lie flush with the contact interface between the backing plate (to which the brake lining is bonded and which may be composed of steel) and the carrier. The magnetic plug may be composed of sintered particles (e.g. Alnico as described in Mark's Mechanical Engineers' Handbook, ed. Theodore Baumeister, McGraw-Hill Book Company, New York, Sixth Edition, 1958, pp. 15-103 ff.) or Oerstite. Within the blind bore or recess in which the magnetic body is seated, I prefer to place a disk, sleeve or lining of soft iron into which the permanent magnet is forced. The soft iron lining thus tightly hugs the magnet to retain it firmly in its bore.

The resulting assembly is suitable for use in brake arrangements, especially disk brakes, wherever two portions of the brakeshoe structure are to contact one another along a planar interface and represents a low-cost technique for mounting the brakeshoes so as to enable them to resist the brake forces and yet be readily removable for replacement. The guide rods, bolts and the like used heretofore can be eliminated and the forces applied to the brakeshoe can be taken up by ridge-and-groove formations between the magnetically attracted contact surfaces.

The above and other objects, features and advantages of my invention will become more readily apparent from the following description, reference being made to the accompanying drawing in which:

FIG. 1 is an axial cross-sectional view, in part, of an embodiment of my invention; and FIG. 2 is an axial cross-sectional view of another embodiment.

In FIG. 1 I show the brakeshoes 29, 30 supported in the brakeshoe supports 5, 6 which are urged, through the fluid pressure of conventional wheel-brake cylinders 31, 32 against the braking faces 23a, 23b of the brake disk 23. The brake disk 23 may have passages 24 for the dissipation of the frictional heat developed on braking and is mounted on the ring flange 25 of the drum 26 by means of the threaded bolt 27 and the nut 28. The braking faces 23a, 23b of the disk 23 confront the juxtaposed brake linings 1, 2 which are composed of wearable material of high frictional coefficient and thermal resistance, and which are mounted on the magnetically permeable backing plates 3, 4. The faces of the backing plates opposite those that carry the brake linings 1, 2 confront corresponding surface areas of the brakeshoe supports 5, 6. Wear-compensating means 40, 50 on either side of the disk 23 are mounted on a bar 31 which is attached to the support 32 of the housing.

The self-adjusting wear-compensating means here shown may be of the type described in the co-pending application Ser. No. 672,509 filed Oct. 3, 1967. It comprises a rod or pin 34, 35 press-fitted into the recess 36, 37 of the bar 36, 37 of the bar 31 and extending axially in a direction normal to the disk 23. On the right hand side of FIG. 1 it can be seen from the cross-sectional representation of the wear-compensating mechanism that the forward end of the rod 35 is surrounded by an annular sleeve 39 enclosing the friction disks 40 which engage the rod 35. A flanged disk 41 separates the friction disks 40 from a stack of Belleville washers 38 mounted under pre-compression between the flanged disk 41 and an annular ring 42. The ring 42 is retained by a housing or cage 43 made of metal.

As frictional wear erodes the brake lining and thereby increases the brake play, the sleeve 39, which is held in the shoe carrier 6, and the cage 43 progressively advance the friction disks 40 during the brake application stroke along the rod 35. When the brake pressure is relieved, the friction of the disks 40 prevents a rearward movement of the flanged disk 41 beyond this brake play and thus maintains the rod 35 in its new rest position relative to the wear of the brake lining 2.

Cylindrical bores 9, 10 whose axes are perpendicular to the direction of the disk 23 are provided in the brakeshoe supports 5, 6. They are open toward the backing plates 3, 4 and receive an easily deformable disk made of soft iron 15, 16 which serves to retain the magnetic plugs. Cylindrical permanent magnets 7, 8 for example, Oerstite or sintered-particle magnets, constitute the plugs and are tightly fitted into the cylindrical bores 9, 10, so that their circular surfaces 11, 12 abut against the backing plates 3, 4 and their circular surfaces 13, 14 are held in place against the closed end of the cylindrical bores 9, 10 by the disks 15, 16. The surfaces 11, 12 are flush with the surfaces of the supports 5 and 6 at the contact bases. The rings 17, 18 made of antimagnetic material (e.g. copper) and adapted to confine the magnetic field surround the magnets 7, 8. They are housed in the recesses 19, 20 of cylindrical shape adjacent the cylindrical bores 9, 10. An additional means for the concentration of the lines of force of the magnetic field is provided by annular grooves of essentially rectangular cross-section 21, 22 surrounding the cylindrical bores 9, 10. The grooves 21, 22 are open toward the brakeshoe supports 3, 4. Their width is approximately equal to the distance between the outer wall of the cylindrical bores 9, 10 and the proximate inner wall of the grooves 21, 22.

The annular semitoroids 44, 45 formed on the backing plates 3, 4, are received in corresponding grooves in the brakeshoe supports 5, 6 and to take up the circumferential forces tending to rotate the brakeshoes in this embodiment of my invention.

In FIG. 2 in which a rotating disk is confronted by a pair of non-rotating brakeshoes in a yoke 60 attached to the axle housing of the vehicle, the permanent cylindrical magnet 46 is received in the cylindrical bore 47 of the backing plate 3. The cylindrical bore 47 of the latter is open toward the wheel brake housing 54. As in FIG. 1, the magnet 46 is shielded by an antimagnetic surrounding ring 48 and a rectangular groove 49. At the closed end of the cylindrical bore 47 a tight fit between the circular face 50 of the magnet and the bore is provided by the soft iron plate 51. The opposite circular face 52 of the magnet 46 abuts against the disk-shaped end 53 of the wheel brake piston 55 in the cylinder 54. The pistons 53, 56 preferably made of highly permeable material (e.g. cast iron or steel) is attracted to the magnet 46 and thus provides by the magnetic interaction the required tight bond between the brakeshoes 29 and the brakeshoe support in the housing 54. The cylinder 55 which is supplied through the port 57 with hydraulic fluid from the master cylinder (not shown) is of conventional construction and mode of operation. It is housed in the wheel brake cylinder 55 and connected with the self-adjusting wear-compensating mechanism 58 according to the method described in the above cited application Ser. No. 672,509 to which reference is made here.

The yoke 60, which is mounted on the axis housing so as to be nonrotatable, may be axially shiftable, e.g. in the form of a floating yoke, or may co-operate with the axially shiftable disk and can have a brakeshoe-support lobe 61 which is not provided with a wheel-brake cylinder. The lobe 61 constitutes a carrier of support analogous to the supports described in connection with FIG. 1. The lobe 61 is connected with the lobe 54 via bridge pieces 62 which allow the brakeshoe to be withdrawn radially (arrow A) through the gap 63 between these bridge pieces. Such structure is conventional and need not be described further here. The means retaining the brakeshoe 64 upon the support 61 includes the braking plate 65 which is composed of magnetically permeable material and is bonded to the lining 66 while having an annular male formation 67 received in a correspondingly shaped groove 68 surrounding a permanent magnet 69 in the form of a cylindrical plug. The face 70 of this magnet lies flush with the surface 71 of the support 61 which constitutes the contact face between the backing plate and the support. The plug 69 is force-fitted into a blind bore 72 formed in the support 61 and is held therein by a soft iron foil 73. A copper ring 74 of antimagnetic material surrounds the magnet 69 as previously noted.

The invention described and illustrated is believed to admit of many modifications within the ability of persons skilled in the art.

I claim:

1. In a disk brake having a brake disk with an annular braking face, a brakeshoe member confronting said face and provided with a generally planar contact surface remote from the disk, and a brakeshoe-support member having an abutment surface bearing against said contact surface and carrying said brakeshoe member, the improvement which comprises a permanent magnet carried by one of said members flush with the respective surface and magnetically permeable means formed by the respective surface of the other of said members for magnetically retaining said brakeshoe member against said support member, and an annular male formation formed on said brakeshoe member along said contact surface and surrounding said permanent magnet, said abutment surface being provided with an annular groove receiving said male formation and of a configuration complementary thereto.

2. The improvement defined in claim 1 wherein said one of said members is formed with a bore opening in the direction of the other of said members, said permanent magnet being tightly fitted in said bore flush with the said surface of said one of said members with a ring of nonmagnetic material surrounding said permanent magnet and received in said one of said members, said surface of said one of said members being formed with a further groove open in the direction of said other of said members and spaced coaxially from said permanent magnet within the first-mentioned groove, said further groove having a generally rectangular cross-section and a width corresponding substantially to the spacing of said further groove from the wall of said bore.

3. The improvement defined in claim 2 wherein said one of said members is said support member and said other of said members is said brakeshoe member, said magnetically permeable means being formed as a metal backing plate of said brakeshoe member, said bore extending perpendicularly to said surfaces, and being integrally formed in said support member, said bore being lined with a body of soft iron retaining said permanent magnet firmly therein, said permanent magnet having a generally cylindrical configuration.

References Cited

UNITED STATES PATENTS 2,938,790  5/1960  Stedman et al.

OTHER REFERENCES

German printed application 1,182,479, November 1964, Erfinder, 188—73.

GEORGE E. A. HALVOSA, Primary Examiner

U.S. Cl. X.R.

188—1, 205